(12) United States Patent
Metzler

(10) Patent No.: US 9,772,185 B2
(45) Date of Patent: Sep. 26, 2017

(54) MEASURING SYSTEM AND METHOD FOR DETERMINING NEW POINTS

(75) Inventor: Bernhard Metzler, Dornbirn (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 942 days.

(21) Appl. No.: 14/002,669

(22) PCT Filed: Apr. 13, 2012

(86) PCT No.: PCT/EP2012/056758
§ 371 (c)(1),
(2), (4) Date: Aug. 30, 2013

(87) PCT Pub. No.: WO2012/140189
PCT Pub. Date: Oct. 18, 2012

(65) Prior Publication Data
US 2014/0210663 A1    Jul. 31, 2014

(30) Foreign Application Priority Data
Apr. 14, 2011   (EP) ..................................... 11162505

(51) Int. Cl.
*G01S 19/51*     (2010.01)
*G01C 15/00*    (2006.01)
(Continued)

(52) U.S. Cl.
CPC .............. *G01C 15/00* (2013.01); *G01S 19/07* (2013.01); *G01S 19/51* (2013.01); *B64C 39/024* (2013.01); *G01C 21/20* (2013.01); *G01S 19/11* (2013.01)

(58) Field of Classification Search
CPC .......... G01S 19/07; G01S 19/11; G01S 19/51; G01C 15/00; G01C 21/20; B64C 39/024
(Continued)

(56) References Cited

U.S. PATENT DOCUMENTS

| 5,644,318 A | 7/1997 | Janky et al. |
| 5,757,314 A | 5/1998 | Gounon et al. |

(Continued)

FOREIGN PATENT DOCUMENTS

| CN | 1856692 A | 11/2006 |
| CN | 101680758 A | 3/2010 |

(Continued)

OTHER PUBLICATIONS

European Search Report dated Sep. 1, 2011 as received in Application No. EP 11 16 2505.

*Primary Examiner* — Chuong P Nguyen
(74) *Attorney, Agent, or Firm* — Maschoff Brennan

(57) ABSTRACT

A geodetic measuring system having at least one reference component which defines a reference point, wherein an absolute position of the reference point is known, and at least one new-point determination component which derives a relative new-point position. It is also possible to derive mutual relative reference information between the reference component and the new-point determination component, in particular for the purpose of referencing with respect to the reference-point position. The measuring system also has an automotive, unmanned, controllable air vehicle, wherein the air vehicle has the reference component which provides the at least one reference point as a mobile reference point. The air vehicle is also designed in such a manner that the reference component can be spatially freely displaced by the air vehicle, in particular can be positioned in a substantially fixed position.

18 Claims, 7 Drawing Sheets

(51) Int. Cl.
*G01S 19/07* (2010.01)
*G01C 21/20* (2006.01)
*G01S 19/11* (2010.01)
*B64C 39/02* (2006.01)

(58) Field of Classification Search
USPC .......................... 342/357.34, 451; 701/300
See application file for complete search history.

(56) References Cited

U.S. PATENT DOCUMENTS

| | | | |
|---|---|---|---|
| 5,886,340 A | 3/1999 | Suzuki et al. | |
| 6,072,642 A | 6/2000 | Shirai | |
| 6,433,858 B1 | 8/2002 | Suzuki | |
| 6,535,816 B1* | 3/2003 | Smith | G01S 19/51 701/469 |
| 6,955,324 B2* | 10/2005 | Tanielian | B64C 39/024 244/3.13 |
| 7,222,021 B2 | 5/2007 | Ootomo et al. | |
| 7,583,373 B2 | 9/2009 | Schwarz | |
| 8,077,913 B2 | 12/2011 | Euler | |
| 8,422,032 B2 | 4/2013 | Buehlmann et al. | |
| 8,483,512 B2 | 7/2013 | Moeller | |
| 8,602,349 B2* | 12/2013 | Petrov | B64C 39/022 244/17.23 |
| 8,797,400 B2* | 8/2014 | Rinner | G06T 3/40 348/117 |
| 8,902,308 B2* | 12/2014 | Rinner | G06T 7/0028 348/117 |
| 9,073,637 B2* | 7/2015 | Ohtomo | B64C 39/024 |
| 9,164,506 B1* | 10/2015 | Zang | G05D 1/0038 |
| 9,233,751 B2* | 1/2016 | Metzler | G01C 15/002 |
| 9,409,656 B2* | 8/2016 | Ohtomo | B64D 47/08 |
| 9,482,524 B2* | 11/2016 | Metzler | G01B 21/04 |
| 2004/0141170 A1* | 7/2004 | Jamieson | G01S 7/4811 356/5.01 |
| 2007/0133012 A1 | 6/2007 | Euler | |
| 2009/0082992 A1 | 3/2009 | Green et al. | |
| 2016/0253808 A1* | 9/2016 | Metzler | B64C 39/024 382/103 |
| 2016/0304198 A1* | 10/2016 | Jourdan | B64C 39/024 |
| 2017/0122736 A1* | 5/2017 | Dold | G01S 17/023 |
| 2017/0138732 A1* | 5/2017 | Pettersson | G01C 11/00 |

FOREIGN PATENT DOCUMENTS

| | | |
|---|---|---|
| DE | 197 107 22 A1 | 10/1997 |
| DE | 19710722 | 10/1997 |
| DE | 199 267 06 A1 | 12/1999 |
| DE | 19926706 | 12/1999 |
| DE | 199 495 80 A1 | 4/2000 |
| DE | 19949580 | 4/2000 |
| DE | 696 14 927 T2 | 4/2002 |
| EP | 1293755 | 3/2003 |
| EP | 1686350 A1 | 8/2006 |
| EP | 1 293 755 B1 | 3/2010 |
| JP | 2004-264120 A | 9/2004 |
| WO | 2009/039929 | 4/2009 |
| WO | 2009/039929 A1 | 4/2009 |

\* cited by examiner

MEASURING SYSTEM AND METHOD FOR DETERMINING NEW POINTS

FIELD OF THE INVENTION

The invention relates to a surveying system having an unmanned, controllable, automotive air vehicle, a method for position referencing, and an air vehicle for use in a system according to the invention.

BACKGROUND

Numerous geodetic surveying devices have been known since antiquity for measuring one or in particular a plurality of target points. The distance and direction or angle from a measuring device to the target point to be measured are recorded as spatial standard data and also in particular the absolute position of the measuring device is detected in addition to any existing reference points.

Generally known examples of such geodetic surveying devices are represented by theodolites, tachymeters, and total stations, which are also designated as electronic tachymeters or computer tachymeters. A geodetic measuring device of the prior art is described, for example, in published application EP 1 686 350. Such devices have electro-sensory angle and distance measuring functions, which permit a determination of the direction and distance to a selected target. The angle or distance dimensions are ascertained in the interior reference system of the device and must possibly still be linked to an external reference system for an absolute position determination.

In many geodetic applications, points are surveyed by placing specially designed target objects. These typically consist of a plumb stick having a targetable module, for example, a reflector for defining the measurement section or the measurement point. These target objects are targeted by means of a surveying device, a direction and a distance to the objects are determined, and a position of the objects is derived.

Similarly to this point measurement, marking of already known target points or of points, the position of which was defined prior to a marking procedure, can be performed. In contrast to the point measurement, in this case, the position or the coordinates of the points to be marked are known and are to be marked. For such a marking procedure, a plumb stick or a surveying rod is conventionally also used, which is guided by a user and positioned on a target point. For this purpose, the user can move toward the target position of the target point based on position information generated by the surveying device, wherein the surveying rod can be automatically targeted from the surveying device by a second person or by an automatic mechanism assigned to the surveying device. If the target point has been reached, the user can perform a marking of the point.

Modern surveying devices such as a total station for such marking and surveying tasks have microprocessors for digital further processing and storage of detected measurement data. The devices are typically produced in a compact and integrated construction, wherein coaxial distance and angle measuring elements and computer, control, and storage units are normally integrated in a device. Depending on the level of development of the total station, means for motorization of the target optics, for reflector-free route measurement, for automatic target search and tracking, and for remote control of the entire device are integrated.

Total stations known from the prior art also have a radio data interface for establishing a radio link to external peripheral components, for example, to a data acquisition device, which can be implemented in particular as a handheld data logger, remote control unit, field computer, notebook, small computer or PDA. By means of the data interface, it is possible to output measurement data acquired and stored by the total station for external further processing, to read in externally acquired measurement data for storage and/or further processing in the total station, to input or output remote control signals for the remote control of the total station or a further external component, in particular in mobile field use, and to transfer control software to the total station.

For aiming at or targeting the target point to be surveyed, geodetic surveying devices of this type have, for example, a telescopic sight, for example, an optical telescope, as a targeting unit. The telescopic sight is generally rotatable about a vertical standing axis and about a horizontal tilt axis relative to a base of the measuring device, so that the telescope can be aligned on the point to be surveyed by pivoting and tilting. Modern devices can have, in addition to the optical vision channel, a camera, which is integrated in the telescopic sight and is aligned coaxially or in parallel, for example, for acquiring an image, wherein the acquired image can be displayed in particular as a live image on the display screen of the display-control unit and/or on a display screen of the peripheral device used for the remote control—for example, of the data logger or the remote operation unit. The optic of the targeting unit can have a manual focus—for example, a set screw for changing the position of a focusing optic—or can have an autofocus, wherein the change of the focal position is performed, for example, by servomotors. Automatic focusing units for telescopic sights of geodetic devices are known, for example, from DE 197 107 22, DE 199 267 06, or DE 199 495 80.

The above-mentioned surveying systems and applications from the prior art share the feature that a position of a surveying device or a surveying rod is to be determined uniquely and with geodetic precision and this position is to be specified at least in an absolute coordinate system. For this purpose, a transformation of the respective measured position information from an inner measuring coordinate system into the absolute, higher-order coordinate system can be performed.

A position determination method having a coordinate transformation for points to be surveyed using a geodetic device is disclosed, for example, in US 2009/0082992. In principle, the intrinsic position of the geodetic device, i.e., the station coordinates of the measuring device, or the position of new points to be surveyed can be derived as a so-called free stationing from measurements with respect to known, fixed measurement points as reference points. This procedure is also designated as referencing of the measuring device position or the new points in relation to the measured and known positioned reference points. For this purpose, firstly the position of the known reference points relative to the viewpoint is calculated in a local coordinate system. With the aid of the known coordinates of the reference points, when the required number of measurements is provided, equalized transformation parameters are calculated, from which the station coordinates sought or the coordinates sought of the new points are derivable.

Furthermore, a target unit or a surveying rod provided with a target unit can be targeted by a stationary position determination unit, for example, a total station, and automatic guiding of a user or operator to a provided target point can be performed employing the image data recorded by the stationary position determination unit.

For this purpose, in U.S. Pat. No. 7,222,021 or corresponding EP 1 293 755, a surveying system, designated in this patent specification as an operator guiding system, is proposed having a stationary measuring unit (position determination unit), which is equipped with imaging means, for example, a camera, and a mobile station having the function of a mobile target unit, which is equipped with display means, for example, a display screen for displaying a current position of the user based on stored landscape images or data and current images, which are seen from the stationary measuring unit. Furthermore, it is disclosed how an operator can be guided to the target point by means of correlation between the current position data, which is measured from the stationary measuring station, including the camera image, for the mobile station, stored data having the provided position of the target point by marking on the display screen of the target unit, for example, by directional display by means of an arrow on the display screen.

Furthermore, positioning or guiding of a user to a previously known target position can be performed based on GNSS signals without the use of a surveying device. A surveying rod can have a GNSS receiver and a processing unit or a controller attachable to the surveying rod for determining position coordinates. By comparing the known target position to the respective position ascertained by the GNSS signals, the user can thus find the target point and perform possible marking there.

A further position determination method for determining a position of an optical geodetic device is known from WO 2009/039929. In this case, the position determination is performed using a mobile unit, which is equipped with a GNSS receiver, and a total station.

This method allows a linkage of a GNSS position determination to a position determination based on a geodetic device and also a usage linked thereto of the respective advantages of both methods. The condition for the method is that the unit moved, for example a work machine, has a position determination device such as a GNSS receiver, using which a position determination is possible at least at some points in time.

GNSS positions are then advantageously determined in real time as reference positions of the advancing work machine and relative positions of the reference point assigned to the work machine by means of the total station for known points in time. The GNSS positions relate to an external coordinate system and the relative positions relate to an internal coordinate system with respect to the total station. Both a GNSS position and also a relative position are at least partially determined for points in time which are identical or are close to one another with respect to time, wherein the positions corresponding with respect to time are each assigned to one another in pairs and therefore respectively form a position pair correlated with respect to time for one or two neighboring points in time.

From the correlations of the respective individual pairs, a balanced relationship can now be derived between external and internal reference systems, wherein this relationship is represented in particular by balanced transformation parameters. The derived balanced relationship specifies how the external reference system relates to the internal reference system with respect to the total station. On the basis of this relationship, for example, the coordinates of the relative positions measured using the total station or the position of the total station itself in the external reference system can be transformed and used for the position determination of the work machine in the external reference system.

A shared requirement for carrying out the above-mentioned method for determining positions is that a connection, e.g., for signal transmission, must be provided between the respective components used for the determination. In particular, for measuring a target point or a reflector arranged on a surveying rod, an optical contact must be provided between surveying device and the reflector, i.e., a measuring beam can be aligned directly without beam interruption on a corresponding target. Similarly thereto, for a position determination by means of GNSS signals, a connection must be able to be established between a GNSS receiver and a number of GNSS satellites for transmitting the signals. Therefore, in each case an interaction between at least two measuring components is the foundation of a reliable and executable position determination. This condition simultaneously forms a shared disadvantage of the methods. If the connection or contact line respectively required for the method is obstructed or interrupted in any way, a determination of the position cannot be performed. Such connection obstructions can be caused, for example, by buildings which are located in a linear connecting line, or rugged terrain, and can therefore prevent the execution of the position determination method.

SUMMARY

It is therefore the object of the present invention to provide an improved surveying system having associated parts and also a corresponding improved method, using which a position determination or a new point determination can be carried out exactly and with a high degree of automation, without or with an inadequate number of known external references.

A special object of the invention is to reference a new point position in a system, although a line of sight is provided from the new point to an inadequate number of references in this system.

These objects are achieved by the implementation of the characterizing features of the independent claims. Features which refine the invention in an alternative or advantageous manner can be inferred from the dependent patent claims.

In surveying practice, a line of sight, i.e., a connection of two units by a signal or an optical connection, from a measuring device, for which the position or by which a position of a new point is to be determined, to known reference points or to a further surveying device, whose position is known, is necessary for a position determination. In practice, this line of sight can be interrupted or obstructed because of obstructions, e.g., buildings, vegetation, or terrain formations, and a position determination of measuring devices or new points can therefore often be carried out only with substantial additional effort or not at all.

A position determination cannot be possible or cannot be possible with the required precision using GNSS measuring devices if the signals of a sufficient number of satellites cannot be received at a measuring device position, for example, because of a high building. Under unfavorable circumstances, a measurement of three or four points whose coordinates are known (satellites) cannot be carried out. In the case of theodolites or total stations, the targeting of reference points or of further total stations, which is necessary for the position determination of the total station, can be made impossible by obstructions, for example, structures or trees. For example, because of the obstructions, at least three points whose coordinates are known cannot be targeted from the theodolites and accordingly directional angles or distances cannot be measured. In addition, it can prove to be disadvantageous that a geometry is predefined by the position of the points whose coordinates are known and of the GNSS measuring device or of the theodolite, which results in poor intersection conditions, for example, a glancing intersection and therefore greater unreliability in the point determination.

In the case of such an interruption of a direct line of sight between measuring device and reference point, according to the invention, a bridge to generate an indirect, oblique line of sight can be produced by an air vehicle or by a reference component carried by an air vehicle. The interruption of the line of sight can thus be remedied or bridged and a position determination can be performed in spite of the interrupted direct line of sight.

The invention relates in particular to a method for determining the position of a measuring device or a new point and optionally the orientation of the measuring device based on mobile, activated reference points, which are generated by an air vehicle and thus form a visual bridge or a transmission bridge between the measuring device and a unit defining a position of the reference points. A visual bridge as defined in the invention can be represented in this case by a point which is visible simultaneously from a measuring device, the position of which is to be determined, and a position determination unit, by which the position of the air vehicle can be determined in an absolute coordinate system, or to which a connection is producible simultaneously from both units. According to this principle, a transmission bridge can be produced by a reference component (transmission component) on the air vehicle, wherein the reference component can be implemented as a reflector, for example.

Originating from the measuring device, for which the position is to be determined, angle measurements can be carried out with respect to a mobile reference point on the air vehicle and/or distance measurements can be carried out between the measuring device and the reference point with reference to a specific point in time and therefore items of relative reference information can be generated and provided in the surveying system. An item of relative reference information, which specifies a relative position relationship of the measuring device to the air vehicle or to the reference component, can be determined, wherein referencing can be carried out in consideration of the item of relative reference information in the absolute coordinate system for a determination of an absolute position, i.e., a position of the measuring device in an absolute coordinate system.

The measurements between the measuring device and the air vehicle can be performed in various ways. On the one hand, the measuring device can be implemented as a surveying device, e.g., a total station, and a reflector on the air vehicle can be actively targeted using this surveying device. Angles from the measuring device to the air vehicle or to the reflector and optionally also a distance between the two devices can be determined therefrom. Alternatively or additionally, the air vehicle can have a module for emitting pseudo-satellite signals, based on which the distance to the surveying device can be ascertained, and therefore the respective current position of the reference point or the reference component can be provided in the form of the pseudo-satellite signals. On the sides of the measuring device, e.g., a surveying rod, a corresponding receiving unit can be provided for receiving the pseudo-satellite signals, wherein—similarly to a GNSS system—a position of the measuring device is derivable from a number of simultaneously received signals or signals which are offset in a defined manner with respect to time, in particular time-synchronous signals. A distance from the measuring device to the signal source, to the air vehicle here, can be determined by the reception of a pseudo-satellite signal.

The mobile reference points can be represented by autonomous or semiautonomous unmanned air vehicles, for example, as drones which move through the air. These air vehicles can freely occupy positions in space, the external coordinates of which are determined, for example, by sensors on board the air vehicle (e.g., GNSS receiver, acceleration sensors) or are determined externally by a further surveying device, which targets the air vehicle, so that the coordinates or the position of the mobile reference point at a specific point in time of the measurements are known. The coordinates thus known can then be provided in the surveying system, for example, by the air vehicle or the surveying device. After a measurement is carried out, the air vehicle can assume a further position autonomously, semi-autonomously, or controlled by the user, and therefore can represent a further mobile reference point. The number of the reference points required for the unambiguous determination of the new point can depend on the respective applied method.

The mobile reference points or the air vehicle or the reference component on the air vehicle can be positioned optimally in accordance with the measuring task in consideration of the environmental conditions, in particular automatically, so that as a result of a suitable geometry of the reference point arrangement, the determination of the position of the new point or the measuring device can be performed with higher precision. Alternatively or additionally to an air vehicle, which successively assumes the role of a plurality of reference points, the use of a plurality of air vehicles can also be performed, which each statically represent one reference point at one position.

In the scope of the invention, the position of the mobile reference points or the reference components at the specific point in time can be determined in various ways. The position of the air vehicle can be established, in that a module arranged on the air vehicle, for example, a reflector, can be targeted by a surveying device, for example, by a total station. The position of the surveying device can already be known, for example, in that previously a calibration procedure was carried out on the part of the surveying device and the device could therefore carry out an intrinsic position determination, for example, by measuring known points in a higher-order coordinate system. If a reflector on the air vehicle is now targeted by this surveying station, by determining the alignment of an emitted measuring beam, the direction to the air vehicle can be determined and a distance to the air vehicle can be established on the basis of a distance measurement carried out by means of the measuring beam. The relative position of the air vehicle to the surveying device can be determined uniquely and exactly from these dimensions, and, with the position of the surveying device known, an absolute, in particular geodetically precise, positioning of the air vehicle can be derived. The control of the air vehicle can be carried out, in particular automatically, based on the position of the air vehicle thus determined, in particular continuously determined.

For this purpose, control data can be obtained from the items of position information and by means thereof, the air vehicle can be automatically flown to a defined target position, for example.

Based on the absolute position of the reference points thus determined at a shared point in time or in a shared time window, and the measurements carried out between the reference points and the measuring device, the position of the measuring device or, originating from this measuring device, a position of a new point to be measured can be calculated in an absolute coordinate system by means of geodetic methods, for example, resection or arc resection. This can be performed, for example, "online" by a computing unit in the air vehicle or "offline" after the surveying on a computer in the office. To execute the position determination, for example, referencing of the determined relative positions with the respective absolute coordinate system can be performed.

Inter alia, the methods of resection and arc resection are known in surveying for determining the position or the coordinates of a point, wherein further methods or a more detailed description can be found in "Vermessungskunde [Surveying]", Heribert Kahmen, Gruyter Verlag, 19th edition, 1997.

In the case of resection, the surveying device is set up at a new point, for example, and the directional angle to at least three reference points whose coordinates are known are measured therefrom. In practice, so-called distant targets (e.g., church towers or crosses on mountain summits) are often used for this purpose, the coordinates of which have been determined by official surveying and are thus known. The coordinates of the new point can then be calculated from the coordinates of the reference points and from the measured directional angles.

In the case of arc resection, the distances to at least three reference points whose coordinates are known are measured originating from a new point. Taking into consideration the fact that all points which are at a specific distance from a known point lie on a sphere, the new point can be calculated as the point of intersection of the three spheres, which result from the distance measurements to the three reference points whose coordinates are known.

Furthermore, the establishment of the position of the reference points or a deviation from a predefined position can be performed continuously by a system component which is in contact with the air vehicle. For this purpose, a transmitter unit assigned to the system component can provide positioning signals, which can be received by a receiver on the air vehicle or the reference component. If this arrangement has, for example, a GNSS transmitter or a GNSS system is used for the purpose of precisely determining the position of the reference component, the air vehicle or the reference component can thus have a GNSS receiver, by means of which position information can be received and a position can be determined therefrom. A GNSS system which is conventional for this purpose can be represented, for example, by GPS or GLONASS. Correspondingly, a GNSS antenna can be arranged on the air vehicle, to be able to receive the signals assigned to the respective system.

In addition thereto, a GNSS reference station can be provided, which is also implemented to receive GNSS signals and additionally provides reference data or correction data, for example, for one of the known DGPS, RTK, or VRS methods to increase the precision for a position determination. An air vehicle adapted for such a reference system can therefore additionally be implemented to receive correction signals and to carry out a geodetic position determination taking into consideration these signals.

In particular, the GNSS reference station can also be implemented by a further air vehicle as a mobile reference station. For this purpose, the position of this air vehicle can again be determined in an external, absolute coordinate system, in particular by means of a surveying device and/or by means of GNSS, and a GNSS correction signal can be emitted on the basis of the determined position by a transmitter unit arranged on the air vehicle. These correction signals can be received by further surveying units or additional air vehicles for the position determination. Furthermore, a precision of the current air vehicle position can be increased by sensors on board the air vehicle. In order that a precision of the correction signals is maintained, the air vehicle can also land at a suitable position and the emission of the correction signal can be performed in the landed state, in particular, the air vehicle can land at a point, the coordinates of which are known, and determine correction values for emission by the correction signals while taking this position into consideration.

A geodetic surveying system according to the invention has at least one reference component defining a reference point, wherein an absolute position of the reference point is known, and at least one new point determination component which derives a relative new point position. Furthermore, an item of mutual relative reference information is derivable between the reference component and the new point determination component, in particular for the purpose of referencing with respect to the reference point position. The surveying system additionally has an automotive, unmanned, controllable air vehicle, wherein the air vehicle carries the reference component, by which the at least one reference point is provided as a mobile reference point. Furthermore, the air vehicle is implemented such that the reference component is freely displaceable spatially by the air vehicle relative to the new point determination component, in particular is positionable substantially fixed in position.

Using such a surveying system according to the invention, a position of a new point, for example, a setup point for a surveying device or a target point which can be targeted using the surveying device, can be derived as a function of the position of mobile reference points. The reference points are provided here by an air vehicle or UAV (unmanned aerial vehicle), wherein the position of the respective reference point is known, for example, from a position measurement. By means of the new point determination component (e.g., total station, theodolite, surveying rod), a relative relationship between the reference component arranged on the air vehicle and the new point determination component can be derived based on the known reference point position and therefore the relative reference information can be ascertained for the new point determination component with respect to the UAV. A position of the new point determination component can be determined therefrom, in particular from a repeated information determination at further reference points which are provided by the UAV or are geographically known. Depending on the application and type of the new point determination component, it can be necessary to take into consideration a specific number of items of reference information for the unique and precise position determination.

Furthermore, the surveying system can have a reference point determination component for determining the absolute reference point position in an absolute coordinate system. A line of sight between the reference component and respectively the new point determination component and the reference point determination component can be generated indirectly by a specific positioning of the reference component, and a referencing of the new point position in the absolute coordinate system can be carried out.

Using the surveying system according to the invention, an absolute position, i.e., a position in an absolute coordinate system, can therefore be determined and provided by a reference point determination component, e.g., by a surveying device or by GPS satellites. For example, an instantaneous position of an air vehicle in a higher-order coordinate system can be determined and provided by means of radio or offered for reception to the components of the system. In addition, an item of relative reference information can be derived using the new point determination component. The derivation of the item of relative reference information can be performed from a measurement carried out actively by the new point determination component or passively by reception and processing of signals, which permit a position determination or represent a signal-dependent position. The new point determination component can be implemented, for example, as a total station, surveying rod, or similar geodetic measuring device.

Furthermore, a reference information transmission can be carried out between the system components, wherein items of information with respect to the respective relative and absolute positions and a relative location of the positions with respect to one another can be combined. In addition, a transmission bridge can be established by the air vehicle, through which an information exchange can be performed between the system components. The bridge generated by the reference component respectively establishes a connection or a line of sight between the components. A transmission of electromagnetic signals, for example, can be ensured by the line of sight in this case, wherein the signals are not interrupted or shaded by obstructions or the signals can be reliably received in spite of shading. The air vehicle can additionally allow free positioning of the reference component in space, e.g., floating in the air, and therefore can make it possible to carry out targeted and defined avoidance of signal-interrupting obstructions.

In particular, according to the invention, a number of reference points can be generated by the spatial displacement of the air vehicle and the air vehicle can be displaceable and positionable in an altitude range of 1 m to 1000 m, in particular in a range of 2 m to 50 m. The reference point can be understood as a fixed reference point on the air vehicle, which is in a defined spatial relationship to the reference component, to a reflector, to a GNSS receiver, and/or to a pseudo-satellite module, and therefore indirectly allows a determination of the respective position of the respective air vehicle component if the reference point position is known. In reverse, if a position of one of these components is known, the reference point position can be concluded. This reference point can be freely positioned or moved in the air by the air vehicle. The air vehicle can fly in an altitude range suitable for geodetic applications, so that respective surveying or position determination can be performed precisely. Depending on the requirement for the measurements, the heights of buildings or other terrain obstructions can be used as relevant target flight altitude ranges for this purpose, in order to overcome a visual obstruction or connection interruption by the building, for example.

Furthermore, a surveying system according to the invention can have an analysis unit for acquiring and assigning the absolute reference point position of the reference point, which is determined and provided by the reference point determination component, and a respective item of relative reference information between the reference component and the new point determination component, in particular of measured angles and/or a distance to the respective reference point, wherein the item of relative reference information can be determined and provided by the new point determination component as a function of the reference point position and a position of the new point determination component. In addition, a pairing can be generated from the assignment of the absolute reference point position and the respective item of relative reference information by the analysis unit.

Using such an analysis unit, associated value pairs can therefore be determined from an item of relative reference information and an item of absolute reference information. Thus, a reference point position determined in the absolute coordinate system can be linked to an item of relative determined information, for example, a distance from a measuring device to the reference point or an angle between them, to form a pairing. A position of the measuring device or a target point by the measuring device can therefore be produced from such pairings, in particular from three or more such pairings.

In the scope of the invention, in a surveying system, the reference component can have a reflector and the reference point determination component can have a geodetic surveying device, in particular a total station or a theodolite. The surveying device can have at least one first targeting apparatus, in particular a telescopic sight, wherein the first targeting apparatus is pivotable by a motor to change the alignment thereof with respect to a first base of the surveying device and has at least one first emission unit, which defines a first optical target axis, and a first beam source for emitting a first optical measuring beam for the distance measurement in parallel, in particular coaxially, to the first optical target axis. In addition, a first angle measuring functionality can be provided for the high precision acquisition of the alignment of the first target axis, and first analysis means can be provided for data storage and control of the alignment of the first targeting apparatus. The first measuring beam can therefore be able to be aligned on the reflector, in particular continuously, so that the absolute reference point position of the reference point can be determined and provided geodetically precisely.

By way of this arrangement, the position of the air vehicle can be determined mediated via the reflector attached to the air vehicle and can be reacquired continuously by target tracking. Therefore, the relative position of the air vehicle to the surveying device can be determined uniquely and exactly and, with the position of the surveying device known, an absolute, in particular geodetically precise, positioning of the air vehicle in an absolute coordinate system can be derived. Based on the position of the air vehicle thus determined, in particular continuously, control of the air vehicle can be carried out. For this purpose, control data can be obtained from the reference information and the air vehicle can be flown to a defined target position by means of this control data, wherein the surveying device can already have been calibrated beforehand in a coordinate system by measuring points, the coordinates of which are known, and an exact position of the air vehicle in this coordinate system can be able to be determined therefrom.

Alternatively or additionally, according to the invention, the reference point determination component can have at least one transmitter unit for emitting positioning signals and the reference component can be implemented in such a manner that the positioning signals are receivable, in particular by means of a GNSS antenna, and the reference point position is determinable from the positioning signals. In particular, the transmitter unit can be implemented as a GNSS transmitter, in particular a GNSS satellite, in particular a GPS, GLONASS, or Galileo satellite, and the positioning signals can be embodied by GNSS signals. Furthermore, the reference point determination component can have a GNSS reference station for emitting GNSS correction signals and the reference component can be implemented in such a manner that the GNSS correction signals are receivable and the reference point position is determinable from the received GNSS signals and the GNSS correction signals.

Similarly to the reference point position determination using a surveying device, the absolute position can therefore be determined by GNSS signals received at the air vehicle. If a correction signal of a reference station is used in addition to the available GNSS signals, the precision in the position determination of the air vehicle can be increased and, as a consequence, a position determination of a measuring device, which references itself to the position of the air vehicle, can be performed more precisely.

In particular, the surveying system according to the invention can have a control unit, wherein the control unit is configured in such a manner that a spatial geometric arrangement of the reference points is definable, in particular automatically, in particular wherein the geometric arrangement of the reference points is definable as a function of an optimization to generate the pairings. Furthermore, the control unit can be configured in such a manner that the air vehicle is positionable as a function of the reference point position, which is determinable by means of the reference point determination component, in particular continuously, and/or as a function of the geometric arrangement of the reference points, in particular automatically. Furthermore, the control unit can be configured in such a manner that a flight path is definable and the air vehicle is movable along the flight path, in particular wherein the flight path is definable as a function of the spatial geometric arrangement of the reference points.

The control unit can therefore determine a suitable arrangement of the reference points, at which the air vehicle can be positioned, wherein the determination can be performed automatically taking into consideration an optimum arrangement of the points with respect to an achievable precision in the determination of the pairings, i.e., with respect to the precision in the determination of the absolute reference point position and/or the item of relative reference information. Alternatively, a definition of reference point positions to be reached can be performed manually by a user and input into the surveying system, in particular by means of a remote control and/or by the input of a CAD terrain model via the remote control or another data interface. Therefore, a precision in the position determination by means of a surveying device and/or by means of GNSS and also a precision in the determination of distances and/or angles between a measuring device, the position of which is to be determined, and the air vehicle can be taken into consideration. Furthermore, the instantaneous position of the air vehicle can be incorporated in the consideration of the positioning. For this purpose, the control unit can activate the rotors of the air vehicle, for example, in such a manner that the air vehicle is moved to a defined target position and positioned thereon. In addition, a flight path for the air vehicle can be determined by the control unit and as a consequence the air vehicle can be controlled in such a manner that it moves automatically, semi-automatically, or manually along the flight path and in particular moves from one reference point to the next.

The determination of positions to be approached can be performed, for example, based on a CAD terrain model and in this determination any possible obstructions in the terrain can therefore be taken into consideration automatically and, for example, avoided by a suitable definition of the flight path. Such terrain models can be transmitted, for example, by means of radio or via wire to the system, for example, to the air vehicle and/or the reference point determination component and/or the new point determination component.

In addition, the system according to the invention can have a remote control unit, wherein the remote control unit is implemented in such a manner that a control of the air vehicle and/or a generation of the pairings can be carried out, in particular wherein a communication between the remote control unit and/or the reference point determination component and/or the new point determination component and/or the reference component can be carried out via wire, or by means of radio, infrared, or laser signals. A user of the surveying system can thus manually control the air vehicle by means of the remote control unit and can therefore approach individually selected points and position the air vehicle at these points. Furthermore, the manual control can also be performed in such a manner that the air vehicle moves continuously and, in the movement, measurements for the position determination of the air vehicle and measurements for the determination of items of relative reference information (angles and/or distances between the air vehicle and the new point determination component) are carried out. Pairings can be generated therefrom continuously and the position determination for the measuring device can be performed therefrom. For this purpose, (newly) generated pairings can be taken into consideration continuously and the set of the pairings used for the position determination can be enlarged and therefore the precision in the determination can be increased. Such a continuous precision increase can also be performed by way of the automatic selection of reference points and pairings generated therefrom, in particular wherein the number of the pairings taken into consideration for this purpose can also be continuously expanded.

Furthermore, by means of the remote control unit, control commands and/or terrain information (CAD model) can be transmitted to a further component of the surveying system and used for controlling the air vehicle and items of information, for example, specific positions, can be transmitted to the remote control unit and provided therein to a user, in particular wherein the information is displayable on a display screen. For example, a measuring environment having measuring devices positioned therein and a moving or a positioned air vehicle can thus be graphically displayed.

In particular, the air vehicle in a surveying system according to the invention can have a sensor unit for determining the alignment of the air vehicle, in particular an inclination sensor, a magnetometer, an acceleration sensor, a yaw rate sensor, and/or a velocity sensor. By way of measurements using this sensor unit, a position determination of the air vehicle can be assisted and the precision thereof can be improved. In addition, a position determination can thus be performed independently of external measuring systems for the position determination, in that, for example, a starting position of the air vehicle is known and, based thereon, the movement—in particular velocity and direction—and changes in the movement of the device are detected by the sensors. In addition, using the sensor unit, a determination of the alignment can be carried out for the control of the air vehicle. Furthermore, the sensor unit, for example, in the event of a failure of the reference point determination component for position determination of the air vehicle or an interruption of a measuring connection, e.g., an optical measuring beam or a GPS signal, to the air vehicle, may make it possible to carry out a temporary position determination, for example, to align a measuring beam on the air vehicle again or to control the air vehicle in such a manner that a GPS signal becomes receivable again.

According to the invention, in particular the reference component can be implemented in such a manner that the reference point position and/or the item of relative reference information can be provided indirectly by the reference component, in particular wherein the reference component has a transmitter for emitting and/or a receiver unit for receiving the reference point position and/or the item of relative reference information, in particular wherein the reference point position and/or the item of relative reference information are transmittable via wire, or by means of radio, infrared, or laser signals, in particular wherein the reference point position can be modulated onto the positioning signals.

The reference component can thus be used as a transmission bridge for reference information or for signals which represent angles, distances, positions, and/or coordinates. Such information can therefore be transmitted from the reference point determination component (surveying device or GPS satellite) to the new point determination component (surveying rod or surveying device), even if a direct connection between the two components cannot be established. For such a transmission, the information can furthermore be modulated onto the signals, by which, on the one hand, the position determination of the air vehicle is performed and/or, on the other hand, the items of reference information are determined.

In the scope of the invention, the reference component of the surveying system according to the invention can have the reflector and the new point determination component can have a second targeting apparatus, wherein the second targeting apparatus is pivotable by a motor to change the alignment thereof with respect to a second base of the new point determination component and has at least one second emission unit, which defines a second optical target axis, and a second beam source for emitting a second optical measuring beam for the distance measurement in parallel, in particular coaxially, to the second optical target axis. In addition, a second angle measuring functionality for the high-precision acquisition of the alignment of the second target axis and second analysis means for data storage and control of the alignment of the second targeting apparatus can be arranged. The second measuring beam can therefore be aligned on the reflector, in particular continuously, so that the item of relative reference information, in particular for position referencing of the new point determination component, can be determined and provided as a function of the reference point position, so that the pairings and/or the new point position can be determined in the absolute coordinate system, in particular a position of a measurable target point.

By means of this second targeting apparatus, which is integrated in a total station, for example, an angle and/or a distance to the reflector on the reference component can be determined and therefore a relative position relationship can be determined indirectly between the air vehicle or the reference point and the total station. Using this relative reference position, as a consequence, an absolute position determination of the total station can be performed, by producing a relationship between the absolute coordinate system, in which the position of the air vehicle is determined, and the item of relative reference information. A requirement for this purpose is to know the respective position of the reference point in the absolute coordinate system. Alternatively or additionally, an absolute position—in the coordinate system in which the position of the air vehicle is determined—of a target point measurable by the total station can be produced, in particular wherein the position of the total station is not determined. For this purpose, a relative position of the target point can be determined and this position can in turn be referenced by a transfer of reference information in the absolute system. The position determination can again be based on the generation of pairings from items of relative reference information, e.g., angles and/or distances between the reference point and the total station, optionally with additional angle and distance to the target point, and absolute reference point position.

In the scope of the invention, the reference component of the surveying system according to the invention can furthermore have a pseudo-satellite module for emitting the positioning signals, in particular wherein the positioning signals represent the absolute reference point position, and the new point determination component can have a pseudo-satellite receiver, wherein the pseudo-satellite receiver is implemented in such a manner that the positioning signals emitted by the pseudo-satellite module are receivable and the item of relative reference information can be determined and provided, so that the new point position can be determined in the absolute coordinate system.

By way of this arrangement, a distance, for example, between a surveying rod and the air vehicle or the reference point can be determined. The surveying rod can represent a passive unit, wherein the pseudo-satellite signals, which represent and provide a position of the reference component and therefore the position of the air vehicle, can be received. From a number, in particular from four such received signals, in the case of given time synchronicity of the signals or, in the case of a known deviation with respect to time of the signals, from three such received signals, a relative position determination of the surveying rod can be performed—similarly to a GNSS method. In addition, the position determination of the surveying rod or a surveying device which is implemented to receive corresponding signals can be performed from GNSS signals and pseudo-satellite signals which are used simultaneously for the determination.

Furthermore, the invention relates to a geodetic referencing method using at least one reference point, the absolute position of which is known, and at least one new point determination component from which a relative new point position is derived. An item of mutual relative reference information, in particular for the purpose of referencing with respect to the reference point position, is derived.

Furthermore, the reference information derivation is carried out by means of a reference component (transmission component), by which the at least one reference point is provided as a mobile reference point, wherein the reference component is carried by an automotive, unmanned, controllable air vehicle and the air vehicle is implemented in such a manner that the reference component is freely displaced spatially, in particular positioned substantially fixed in position, by the air vehicle relative to the new point determination component.

Furthermore, the absolute reference point position can be determined in an absolute coordinate system using a reference point determination component, and/or a line of sight can be indirectly generated between the reference component and respectively the new point determination component and the reference point determination component by a specific positioning of the reference component, and referencing of the new point position can be carried out in the absolute coordinate system.

Using the air vehicle, a bridge for transmitting items of information can be produced for the referencing method, wherein items of reference information can be exchanged between the reference point determination component and the new point determination component by this transmission, and referencing of positions can be performed. Thus, a relative position relationship between the new point determination component and the reference component can be transferred into an absolute coordinate system and thus an absolute position, i.e., a position specification in the absolute coordinate system, of the new point determination component can thus be determined. To provide such a transmission bridge, the air vehicle and the reference component carried by the air vehicle can be positioned freely in space. This allows the establishment of an indirect line of sight between respectively the air vehicle or the reference component and the reference point determination component and the new point determination component and therefore the mutual information derivation.

In particular, in the scope of the geodetic referencing method according to the invention, the mobile reference point can be spatially displaced by the air vehicle, so that a number of reference points is generated, and the air vehicle can be displaced and positioned in an altitude range from 1 m to 1000 m, in particular in a range from 2 m to 50 m.

Furthermore, according to the invention, detection and assignment can be carried out, of the absolute reference point position of the reference point, which is determined and provided by the reference point determination component, and of a respective item of relative reference information, in particular of measured angles and/or a distance to the respective reference point, wherein the relative reference information is determined and provided by the new point determination component as a function of the reference point position and a position of the new point determination component. In addition, generation can be performed of a pairing from the assignment of the absolute reference point position and the respective item of relative reference information.

By way of the specification of a reference point on the air vehicle, an absolute position of this point can be determined and provided by the reference point determination component, for example, a total station, a tachymeter, or a theodolite. This absolute position can therefore be determined in an absolute coordinate system. In addition, by means of the new point determination component, e.g. embodied as a total station or surveying rod, angles and/or distances (item of relative reference information) to the air vehicle or to the reference point can also be determined and provided. These determined dimensions can respectively be assigned to one another in a pairing. For this assignment, the line of sight between the air vehicle and the further components must again be established. For this purpose, the air vehicle can be moved in such a manner that it is moved or positioned at a specific altitude, so that an obstruction which obstructs a connection between the components can be bypassed or avoided. Thereafter, a position determination for the new point determination component can be carried out from a number of pairings. This can be performed by means of methods known in surveying, for example, resection or arc resection.

Furthermore, according to the invention, a spatial geometric arrangement of the reference points can be defined, in particular automatically, in particular wherein the geometric arrangement of the reference points is optimized as a function of the generation of the pairings. In addition, the air vehicle can be positioned as a function of the absolute reference point position, which can be determined, in particular continuously, and/or as a function of the geometric arrangement of the reference points, in particular automatically, and/or a flight path can be defined and the air vehicle can be moved along the flight path, in particular wherein the flight path is defined as a function of the spatial geometric arrangement of the reference points.

To generate the pairings, the reference points, which can be positioned in a mobile and free manner by the air vehicle, or the arrangement and positioning thereof, can be determined in such a manner that the highest possible precision is achieved in the determination of the absolute position of the new point determination component and/or in the generation of the pairings. For this purpose, the air vehicle can accordingly be flown to the respective position and the position thereof can be determined geodetically precisely, in particular continuously. An increase in precision can additionally be achieved in that the number of pairings used for the absolute position determination of the new point determination component is continuously increased with the generation of new reference points and a determination uncertainty is therefore reduced. A suitable arrangement of the reference point position can be performed automatically, for example, wherein the points can be established based on a digital terrain model and optionally taking into consideration a position of a surveying device, which establishes the position of the air vehicle. In addition, the definition of the reference point positions can be performed manually and a user can freely define these points in the scope of the referencing method and can control or move the air vehicle manually to these positions, for example, using a remote control, and position it there. For example, a suitable geometric arrangement of the points can be established in such a manner that a glancing intersection does not result from a resection or from an arc resection, but rather in particular an angle between a new position to be determined and the respective successive reference points is respectively greater than 90°. Furthermore, the flight path, along which the air vehicle is to fly, can be determined manually or automatically. The route can be planned automatically based on the terrain model, for example, a CAD model, and as a function of any possible obstructions or of already established target reference points. The air vehicle can fly completely automatically along this route or can be controlled semi-automatically, i.e., the air vehicle can approach a reference point and position itself there and fly automatically to the next point upon a user input.

In particular, in the scope of the method according to the invention, positioning signals provided by the reference point determination component can be received by the reference component, in particular GNSS signals provided by GNSS satellites, in particular wherein the GNSS signals are represented by GPS, GLONASS, or Galileo signals, and the absolute reference point position is determined and provided from the received positioning signals. Furthermore, the determination and provision of the reference point position can be performed by means of a first measuring beam, which is emitted by the reference point determination component and is reflected on the reference component, and/or a determination of an alignment of the air vehicle in the pitch, yaw, and roll directions can be performed, in particular wherein the determination of the alignment is performed by means of an internal sensor unit assigned to the air vehicle, in particular by means of an inclination sensor, magnetometer, acceleration sensor, yaw rate sensor, and/or velocity sensor.

By way of the above-mentioned method, respectively the position and/or the alignment of the air vehicle at the respective flight position can be determined and provided, wherein this information can be further processed for the control of the air vehicle, on the one hand, and/or can be used for the absolute position determination of the new point determination component, on the other hand.

In particular, according to the invention, in the scope of the method, positioning signals, in particular pseudo-satellite signals representing the reference point position, can be emitted from the reference component, and the positioning signals can be received by the new point determination component and the item of relative reference information can be determined as a function of the reference point position, so that the new point position is determined in the absolute coordinate system.

In particular, according to the invention, in the scope of the method, the determination of the item of relative reference information can be performed by means of a second measuring beam, which is emitted by the new point determination component and reflected on the reference component, so that the pairings and/or the new point position are determined in the absolute coordinate system, in particular a position of a measured target point.

The determination of the relative reference information can therefore be performed in two ways. On the one hand, targeting of the air vehicle can be performed actively from the new point determination component and an angle and/or a distance to the air vehicle can be ascertained therefrom. On the other hand, a signal which represents a respective position of the air vehicle can be emitted from the air vehicle and can be passively received by the new point determination component (similarly to a position determination by means of GPS). A distance to the air vehicle may again be derived therefrom, in particular if a plurality of signals are received, in particular in a time-synchronous manner, simultaneously or offset in time.

Furthermore, the invention relates to an automotive, unmanned, controllable air vehicle, in particular a drone, for a surveying system according to the invention, wherein the air vehicle is freely displaceable spatially relative to the new point determination component, in particular is positionable substantially fixed in position. The air vehicle carries a reference component for providing a mobile reference point.

In particular, the air vehicle according to the invention can receive control data for controlling the air vehicle and/or can derive the control data for controlling the air vehicle by way of a processing unit from receivable reference information for determining an absolute reference point position, in particular wherein an air vehicle alignment is determinable by a sensor unit assigned to the air vehicle. Furthermore, the absolute reference point position and an item of relative reference information can be linkable by the processing unit, so that a pairing can be generated.

According to the invention, in particular the air vehicle can be implemented in such a manner that the mobile reference point is spatially displaceable by the air vehicle, in particular is positionable substantially fixed in position, so that a number of reference points and pairings can be generated, and the air vehicle is displaceable and positionable in an altitude range from 1 m to 1000 m, in particular in a range from 2 m to 50 m.

In particular, the reference component of the air vehicle can furthermore have a pseudo-satellite module for emitting positioning signals for determining the item of relative reference information, in particular for determining an absolute new point position in an absolute coordinate system, and/or can have a reflector for determining the item of relative reference information, in particular by targeting the reflector using a laser beam, so that the pairings and/or the new point position are determinable in the absolute coordinate system, in particular a position of a measurable target point.

According to the invention, an unmanned, controllable, automotive air vehicle can be used to carry a reference component for a geodetic surveying system to generate a transmission bridge for reference information derivation, in particular wherein a line of sight is producible between individual system components by the reference component.

A further object of the invention is a computer program product, which is stored on a machine-readable carrier, or computer data signal, embodied by an electromagnetic wave, having program code for carrying out a method according to the invention, in particular when the program is executed in an electronic data processing unit. The computer program product or computer data signal can be designed in such a manner that control instructions are provided therein, in particular in the form of algorithms, using which a method according to the invention for generating a transmission bridge using an automotive, unmanned, controllable air vehicle can be carried out.

BRIEF DESCRIPTION OF THE DRAWINGS

The method according to the invention, the system according to the invention, and the air vehicle according to the invention are described in greater detail hereafter solely as examples based on specific exemplary embodiments which are schematically illustrated in the drawings, wherein further advantages of the invention are discussed. In the figures.

DETAILED DESCRIPTION

Figure 1:
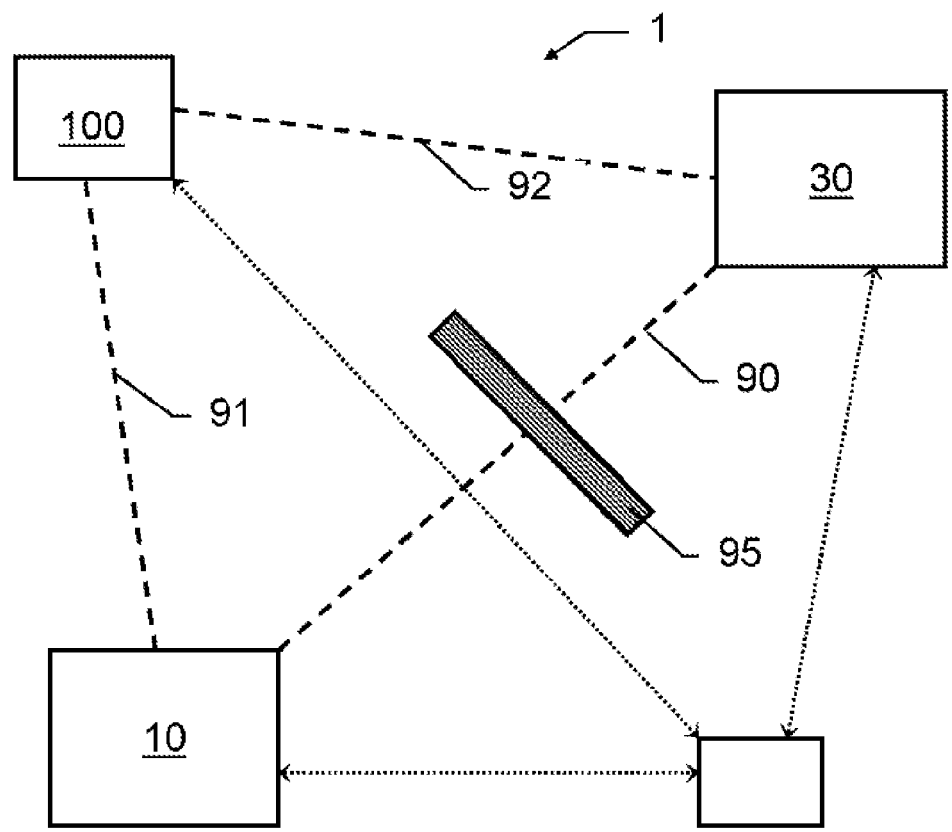
FIG. 1 shows a schematic view of a surveying system according to the invention.

FIG. 1 shows a schematic view of a surveying system 1 according to the invention having a reference point determination component 10 and a new point determination component 30, wherein a position of the new point determination component 30 is to be determined. The position of the reference point determination component 10 is known, for example, from preceding measurements and can be used as a reference position for determining the position of the new point determination component 30. Furthermore, an obstruction 95 is located in the direct line of sight 90 between the two system components 10, 30 and thus prevents the possibility of determining the position by means of a direct connection of the two components 10, 30 to one another. Such a position determination could—if the line of sight 90 were established—be performed by distance measurements between the components 10, 30 along the line of sight 90, for example.

Furthermore, a reference component 100, which is carried by an air vehicle (not shown), is provided for the position determination of the new point determination component 30. Respectively a line of sight 91 between the reference point determination component 10 and the reference component 100 and a line of sight 92 between the new point determination component 30 and the reference component 100 are established by the reference component 100. By means of such an arrangement, a position determination of the new point determination component 30 can therefore be performed indirectly. For this purpose, an absolute position, i.e., a position in an external absolute coordinate system, of the reference component 100 can be determined by means of the reference point determination component 10 and, simultaneously or within a specific time window, an item of relative reference information, of the new point determination component 30 with respect to the reference component 100 can be determined.

An absolute position of the new point determination component 30 in the absolute coordinate system can be derived by means of an analysis unit 60 from the determined absolute position of the reference component 100 and the item of relative reference information. For this purpose, for example, measured angles and/or distances between the components, which respectively can embody specific positions, can be provided to the analysis unit 60 and the position to be determined can be calculated from the provided dimensions.

Figure 2:
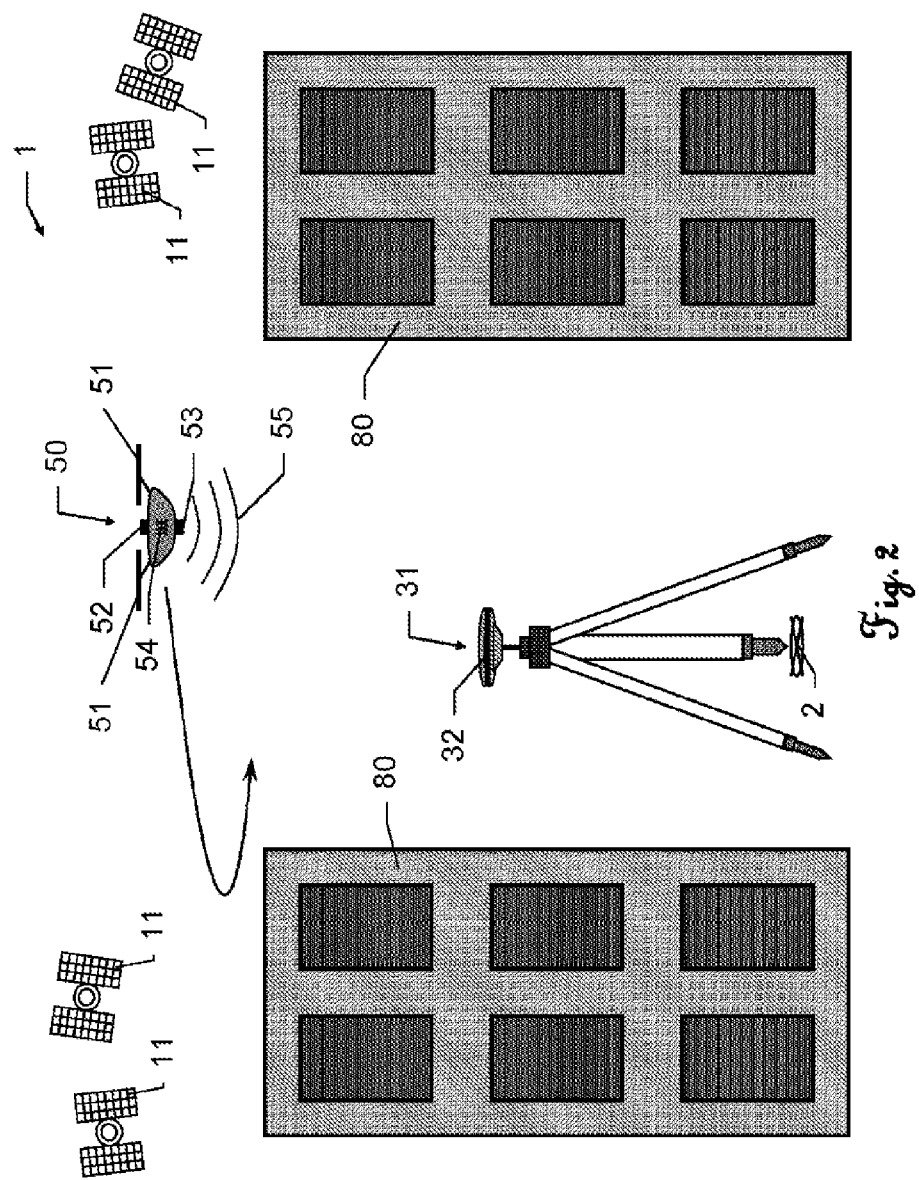
FIG. 2 shows a first embodiment of a surveying system according to the invention having a GNSS system, an air vehicle, and a measuring device.

FIG. 2 shows a first embodiment of a surveying system according to the invention having a GNSS system embodied by GNSS satellites 11, an air vehicle 50, and a surveying instrument 31. The air vehicle 50 is equipped with a pseudo-satellite module 53 for imaging a signal 55—comparable to a GNSS signal—which can be received by a pseudo-satellite receiver 32 arranged on the surveying instrument 31. On the basis of this pseudo-satellite signal 55, a distance measurement from the air vehicle 50 to the surveying instrument 31 can be carried out and therefore items of relative reference information can be determined. In addition, at the point in time of the distance measurement, the position of the air vehicle 50 can be determined by sensors thereon and the coordinates or the position of the mobile reference point, which is assigned to the air vehicle 50 and is in a fixed spatial relationship thereto, can be transmitted to the surveying instrument 31. The reference information can be modulated in coded form onto the signal 55 and can be received therewith by the surveying instrument 31 or can alternatively or additionally be transmitted via radio thereto and can be received using a further receiver unit.

For the determination of the absolute position (in an external, absolute coordinate system) of the surveying instrument 31 or for the absolute position determination of a new point 2, at which the surveying instrument 31 is set up, the air vehicle 50 can move to at least three significantly different positions and thus represent a plurality of reference points. At each of these positions, a distance measurement can be carried out between the respective reference point and the surveying instrument 31 based on the pseudo-satellite signals 55 and also the coordinates of the reference point can be determined and transmitted to the surveying instrument 31. Based on the coordinates of the reference points and the measured distances, the position or the coordinates of the new point 2 or the surveying instrument 31 can be calculated in a computing unit, for example, on the surveying instrument 31, by means of arc resection.

For the determination of the position of the mobile reference points in the absolute coordinate system, the unmanned air vehicle 50 is additionally equipped with a GNSS receiver unit 52. Using this receiver unit, GNSS signals are received from GNSS satellites 11 and, based thereon, the absolute position or the coordinates of the air vehicle 50 or the mobile reference points are calculated. In addition, the air vehicle 50 can be equipped with a sensor unit 54, consisting, e.g., of a magnetometer, an inclination sensor, an acceleration sensor, and/or a yaw rate sensor. Improved precision of the determination of the reference point position can be achieved or an alignment and/or a movement of the air vehicle 50 can be determined by corresponding measurements of this sensor unit 54.

For the position determination, the air vehicle 50 can respectively assume suitable positions, wherein a connection between the air vehicle 50 and the GNSS satellites 11 and between the air vehicle 50 and the surveying instrument 31 respectively exists at the respective positions. The surveying instrument 31 remains positioned fixed in place at one position during the position determination. By way of the arrangement of at least two, in particular four or more rotors 51 on the air vehicle 50, such a positioning can be performed and maintained. Under this condition, a determination of the absolute position of the air vehicle 50 by the satellites 11 and the item of relative reference information by means of the pseudo-satellite signals 55 can be performed simultaneously or within a defined time window. Pairings can thus respectively be derived from these determinations, from which a position determination of the new point 2 or the position of the surveying instrument 31 can be carried out when the pairings are considered together. For a reliable and precise position determination, the air vehicle 50 can assume respective suitable positions for generating a number of reference points, in particular three significantly different points. The positions can be selected, in particular automatically, such that shading or interruption of the respective connection between the individual components by the obstructions, e.g., building 80, can be avoided. Furthermore, the positions can represent an advantageous geometric arrangement and thus can result in high precision in the determination during the execution of the arc resection for position determination.

Figure 3:
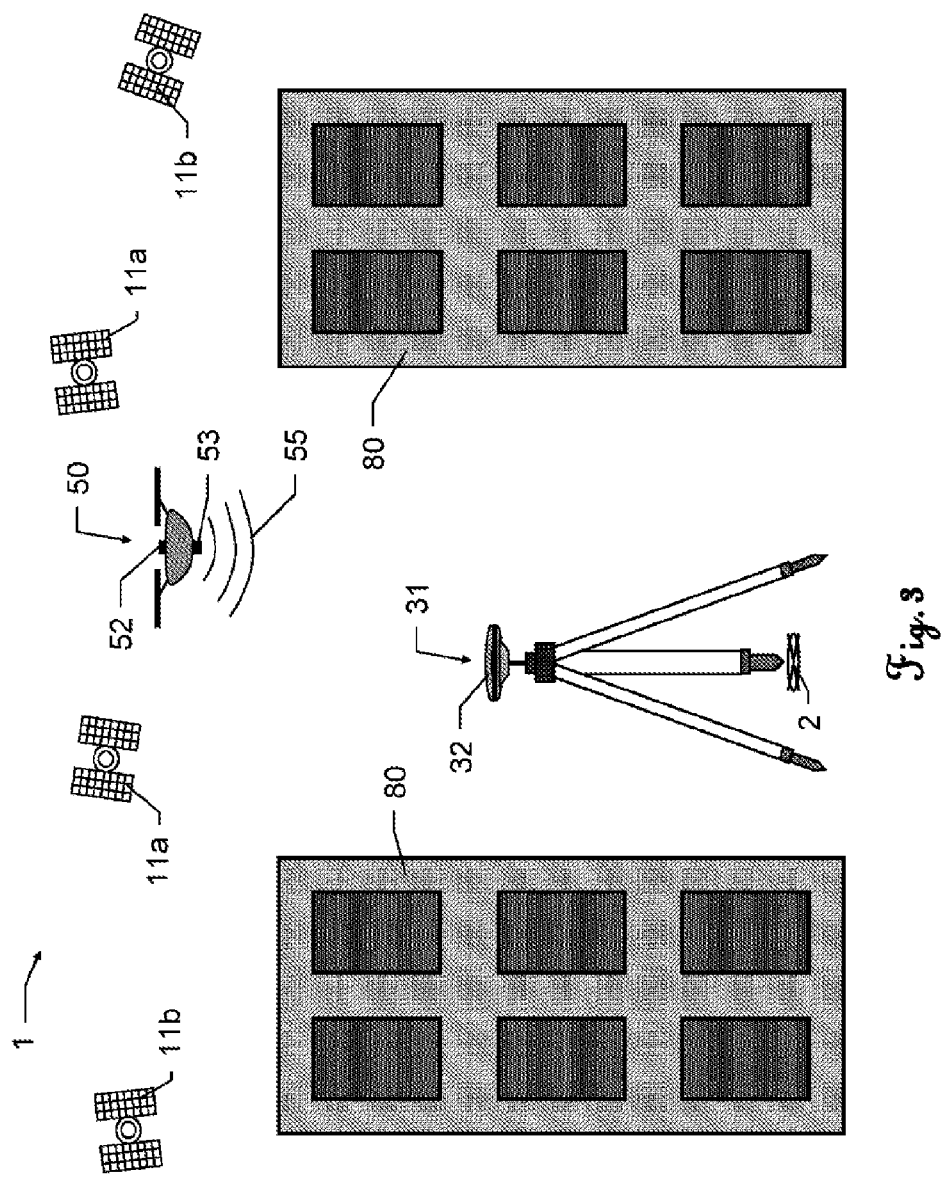
FIG. 3 shows a further embodiment of a surveying system according to the invention having a GNSS system, an air vehicle, and a measuring device.

The pseudo-satellite signal 55, which is emitted by the transmitter units 53 of the air vehicle 50, can additionally be designed in such a manner, for example, that it corresponds to a GNSS signal and therefore can be received by conventional GNSS surveying devices and the position can thus be analyzed. FIG. 3 shows a further embodiment of a surveying system 1 according to the invention having GNSS satellites 11a, 11b, an air vehicle 50, and a surveying instrument 31. The air vehicle 50, which can represent a group of air vehicles here, is equipped with a pseudo-satellite module 53 for emitting a signal 55, which corresponds to a GNSS signal or represents a pseudo-satellite signal, which can be received by a pseudo-satellite receiver 32 arranged on the surveying instrument 31. The receiver can be implemented in such a manner that GNSS signals or pseudo-satellite signals or both signal types jointly can be received. A distance measurement from the air vehicle 50 to the surveying instrument 31 can be carried out on the basis of the signal 55 and therefore items of relative reference information can be determined. In addition, at the point in time of the distance measurement, the position of the air vehicle can be determined by sensors thereon and the coordinates or the position of the mobile reference point, which is assigned to the air vehicle 50 and is in a fixed spatial relationship thereto, can be transmitted to the surveying instrument 31. The item of reference information can be modulated in coded form onto the signal 55 and can be received therewith by the surveying instrument 31, or can alternatively or additionally be transmitted via radio thereto and received using a further receiver unit.

For the determination of the position of the surveying instrument 31 or a new point 2, at which the surveying instrument 31 is set up, the GNSS signals of the satellites 11*a* can be received and used, wherein the satellites 11*a* shown can represent a group of GNSS satellites. Since due to the obstructions 80, receiving a sufficient number of signals of the satellites 11*a* for an adequate position determination is prevented, a reliably precise position determination cannot be carried out solely on the basis of the receivable GNSS signals. Additional mobile reference points for position determination can now be provided by the one or more air vehicles 50. The air vehicle 50 can move for this purpose to respective defined positions. At these positions, a distance measurement can respectively be carried out between the reference point and the surveying instrument 31 on the basis of the pseudo-satellite signals 55 and also the respective position of the reference point can be determined and transmitted to the surveying instrument 31. The position of the reference point can be produced, for example, by means of the GNSS signals provided by the satellite group 11*a* and by using additional GNSS signals of the satellites 11*b*, which are again shown as representative of a group of satellites. The air vehicle 50 can be positioned in such a manner that the signals of both satellite groups 11*a*, 11*b* can be received at the air vehicle 50 and the signals 55 emitted from air vehicle 50 can be received by the receiver unit 32 at the surveying instrument 31. Using the receivable GNSS signals of the satellites 11*a* and the additional pseudo-satellite signals 55 of the air vehicle 50, in particular wherein a plurality of reference points are provided by the air vehicle 50, the position of the surveying instrument 31 or of the new point 2 can therefore be determined.

Figure 4:
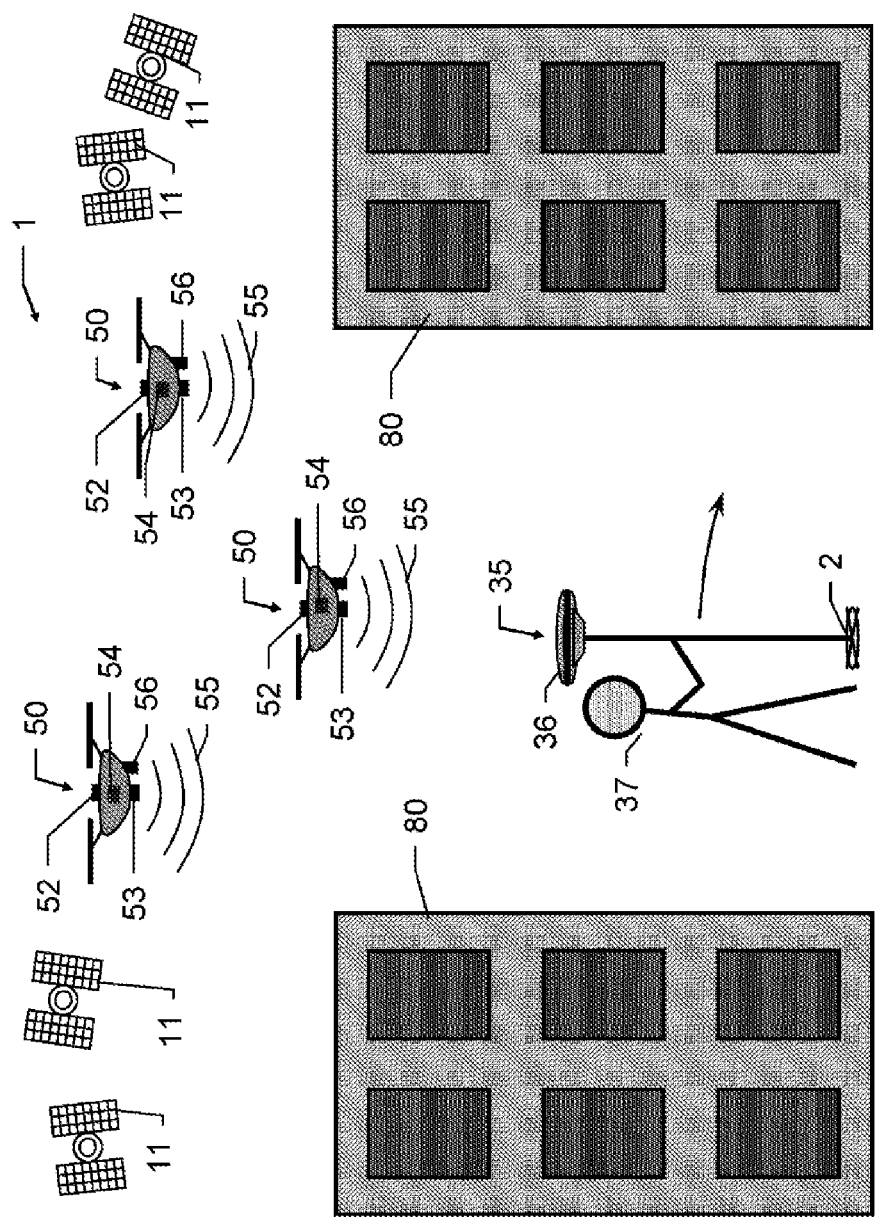
FIG. 4 shows a further embodiment of a surveying system according to the invention having a GNSS system, unmanned air vehicles, and a surveying rod.

FIG. 4 shows a further embodiment of the surveying system 1 according to the invention having GNSS satellites 11, unmanned air vehicles 50, and a surveying rod 35 carried by a user 37. A plurality of unmanned air vehicles 50 are used in this embodiment. Each of these air vehicles 50 is equipped with a pseudo-satellite module 53 for respectively emitting a signal 55—comparable to a GNSS signal—which can be received by a pseudo-satellite receiver 36 arranged on the surveying rod 35. On the basis of these pseudo-satellite signals 55, distance measurements can again be carried out from the air vehicles 50 to the surveying rod 35 and therefore items of relative reference information can be determined. On the basis of the distances thus ascertained and the positions or coordinates of the air vehicles 50 or the positions of the mobile reference points, which are assigned to the air vehicles 50 and are in a fixed spatial relationship thereto, the position or the coordinates of the surveying rod 35 or of the new point 2 can be calculated by means of arc resection, wherein the positions of the air vehicles 50 can be transmitted to the surveying rod 35, for example, coded onto the pseudo-satellite signals 55 or via radio.

In this embodiment, the air vehicles 50 can remain substantially statically at one position. In addition, at least three or four air vehicles 50 can be used and therefore a sufficient number of distance measurements can be carried out for a unique coordinate determination of the new point 2. As a result of the substantially synchronous distance measurement thus possible of a plurality of air vehicles 50 to the surveying rod 35, a progressive or continuous determination of the positions and/or coordinates is possible here. Therefore, a position determination of the surveying route 35—in contrast to the first embodiment (FIG. 2)—can also be carried out during a movement of the rod.

For the determination of the positions of the reference points, the unmanned air vehicles 50 are additionally each equipped with a GNSS receiver unit 52. Using this receiver unit, GNSS signals are received from GNSS satellites 11 and, based thereon, the positions or coordinates of the reference points are calculated, which can be provided to the surveying rod 35. In addition, the air vehicles 50 can have receivers 56 for receiving the pseudo-satellite signals 55, so that distances between the air vehicles 50 can also be determined and therefore a higher precision can be achieved in the determination of the reference point positions. In addition, each air vehicle 50 can also be equipped with a sensor unit 54 here, wherein the measurements of the sensor unit 54 can result in improved precision of the measuring positions or can be used for the determination of the alignments and movements of the air vehicles 50. The latter can be important in particular for the control if the air vehicles 50 are to remain floating at a specific position and are subjected to external influences, for example, wind. A correction or balancing of the position of the air vehicles 50 or the emitted signals 55 can then be performed on the basis of the measurements of the sensor unit 54.

During the positioning of the air vehicles 50, an optimum measuring configuration, i.e., a suitable geometric arrangement of the reference point positions, can be sought while taking into consideration obstructions 80. The air vehicles 50 can thus acquire suitable reference points which generate an indirect line of sight between the components (GNSS satellites 11 and surveying rod 35) and can remain substantially statically floating thereon or can move through the air controlled in a defined manner.

Figure 5:
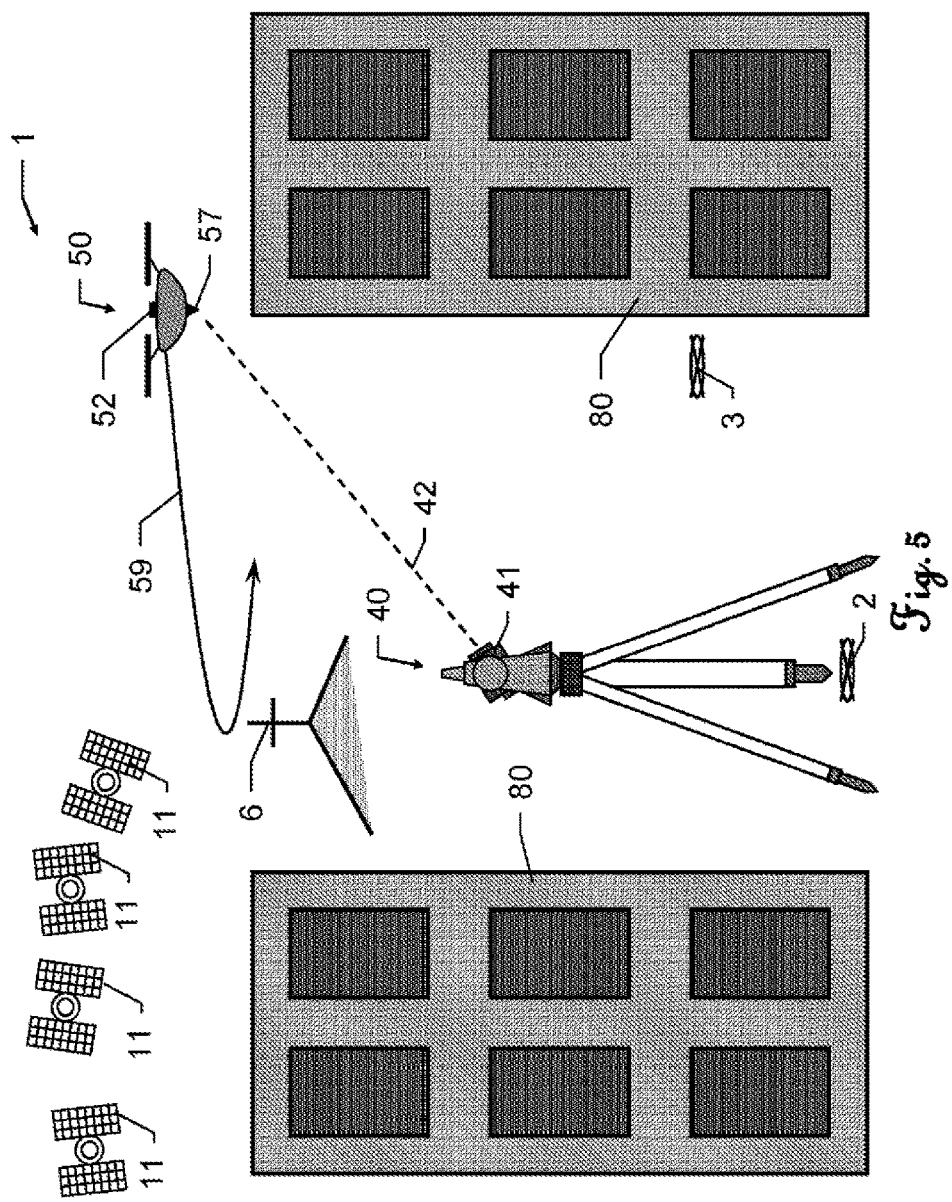
FIG. 5 shows a further embodiment of a surveying system according to the invention having a GNSS system, an unmanned air vehicle, and a surveying device.

FIG. 5 shows a further embodiment of a surveying system 1 according to the invention having GNSS satellites 11, an unmanned air vehicle 50, and a surveying device 40, for example, a total station or a theodolite. The air vehicle is provided with a GNSS receiver 52 for the determination of a position of the air vehicle 50 or a reference point assigned to the air vehicle 50. Using this receiver, GNSS signals, for example, GPS signals, which are emitted by a GNSS satellite, for example, from a GPS satellite, can be received and thus the position or the coordinates of the reference point at the air vehicle 50 can be determined and thereafter provided to the surveying device 40. A plurality of reference points, respectively represented by the air vehicle 50 at a respective position, can again be generated by a movement 59 of the air vehicle 50, in particular along a previously defined flight path, and the positions thereof can be determined by the GNSS system. In addition, further already known reference targets, represented here by the reference target 6, can also be located in visual range.

Furthermore, a target mark or a reflector 57 is attached to the unmanned air vehicle 50, on which target mark or reflector the measuring beam 42 of a targeting unit 41 of the surveying device 40 can be aligned. The targeting unit 41 is pivotable in a controlled manner manually or by motor about two axes for this purpose. The surveying device 40 can additionally be aligned, in particular automatically, on the reflector 57 of the air vehicle 50 and "coupled" thereon, so that automatic target tracking of the reflector 57 or the air vehicle 50 can be performed. Such target tracking can be implemented by means of an automatic target recognition device (automated target recognition, ATR) which is integrated in the surveying device 40. For this purpose, the offset of a laser beam reflected by the reflector 57 from a neutral position on a photodiode can be acquired in such a manner that a movement direction of the reflector 57 relative to the surveying device 40 can be derived from the deviation and the surveying device 40 can be tracked in accordance with this movement or the alignment of the surveying device 40 or of the targeting unit 41 on the reflector 57 can be readjusted, so that the deviation on the photodiode is minimized. Based on a measurement using an angle measuring apparatus provided on the surveying device 40, the horizontal and/or the vertical directional angle to the reflector 57 on the air vehicle 50 can be determined in relation to the setup location of the surveying device 40. In particular, the distance to the air vehicle 50 can additionally be measured using a distance meter on the surveying device 40.

For the position determination of the new point 2 or the position of the surveying device 40, the air vehicle 50 can position itself differently and thus generate reference points, wherein the minimum required number thereof for a reliable position determination can depend on the respective type of the measurements. For example, in the case of an additional use of the known reference target 6 for the position determination, the required number of mobile reference points to be targeted can be reduced and the determination can be performed from a combination of mobile reference point and known reference targets. The air vehicle 50 can be positioned, in particular automatically, in such a manner that a direct line of sight, which is interrupted by a building 80, for example, between the GNSS satellites 11 and the surveying device 40, can be bridged indirectly by the air vehicle 50, so that respectively a connection exists between air vehicle 50 and GNSS satellites 11 or the surveying device 40. At each of these positions, an angle measurement and/or distance measurement to the air vehicle 50 is carried out using the surveying device 40 and a relative position, i.e., a position in a relative coordinate system, of the air vehicle 50 to the surveying system 1, or items of relative reference information, are provided. This can be performed, for example, via radio or modulated onto the measuring beam 42. Simultaneously or within a specific time window, the respective absolute position, i.e., the position of the air vehicle 50 in an external, in particular absolute coordinate system, can be determined by GNSS.

On the basis of the measured directional angles and/or distances and the absolute coordinates of the reference points, the position or coordinates of the new point 2 or the position and optionally the orientation of the surveying device 40 can be calculated by means of geodetic methods (for example, resection or arc resection). In addition, in particular a further target point 3 can be targeted using the surveying device 40 and the position or coordinates thereof can be determined. By way of a coordinate transformation, the position of the target point 3 can now also be determined likewise in the absolute coordinate system. For the position determination, in addition the respective determined items of relative information and absolute positions or the measured angles and/or distances and the determined absolute position of the air vehicle 50 are related to one another by a calculation of a relative relationship and, from a number of pairings derived therefrom, a position of the surveying device 40 or of the new point 2 and/or of the target point 3 in the absolute coordinate system is determined.

Figure 6:
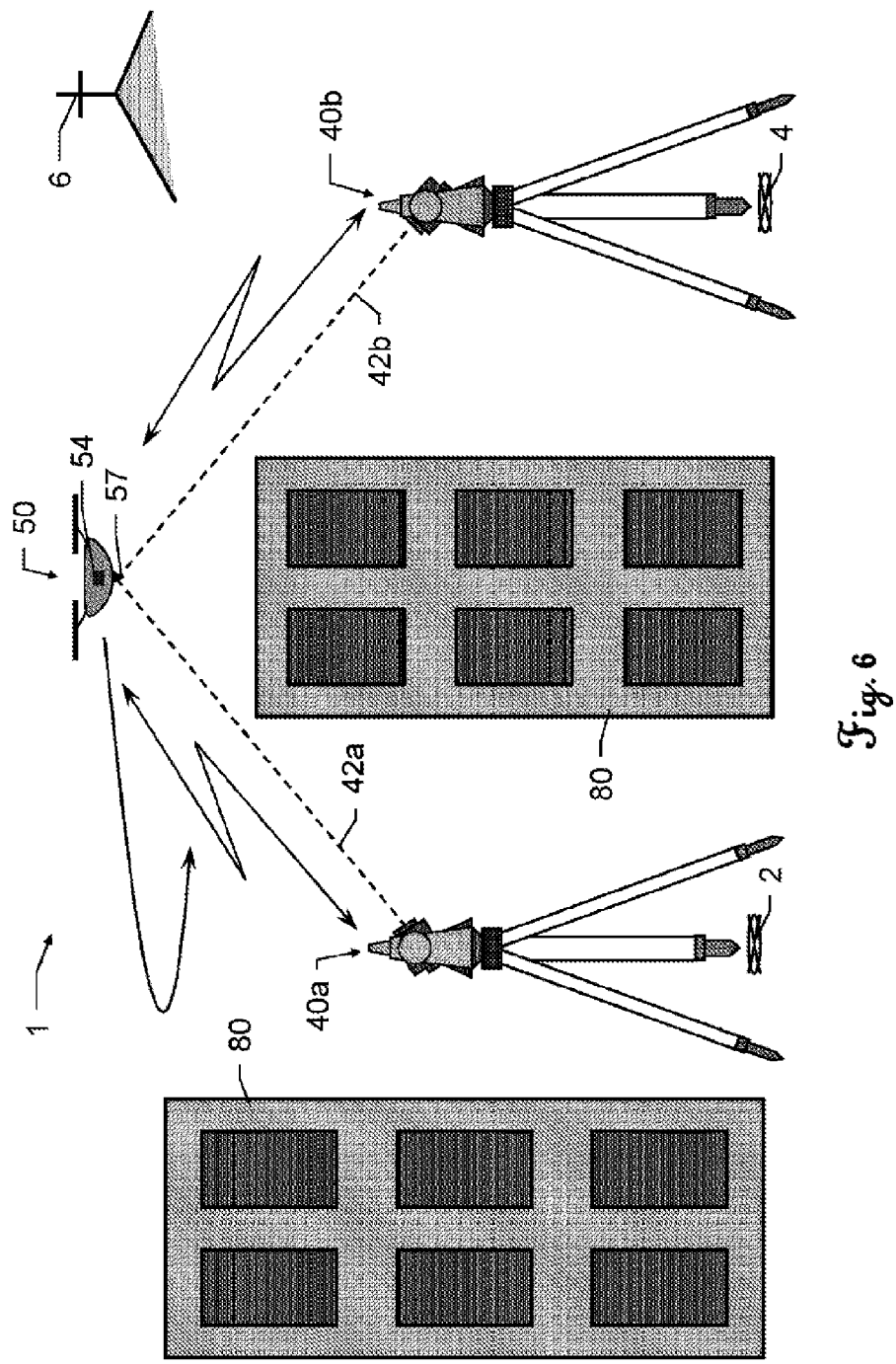
FIG. 6 shows a further embodiment of a surveying system according to the invention having an unmanned air vehicle and two surveying devices.

FIG. 6 shows a further embodiment of a surveying system 1 according to the invention having an unmanned air vehicle 50 and two surveying devices 40a, 40b. In this embodiment, the determination of the reference point position or the position of the air vehicle 50 in the absolute coordinate system can be carried out using a surveying device 40b, the measuring beam 42b of which is aligned on a reflector 57 fastened on the air vehicle 50, in particular is coupled onto the air vehicle 50 by means of target tracking, by means of angle measurements and distance measurements. The position or coordinates of the reference point are then provided to the surveying system 1, for example, via radio, in particular transmitted to the surveying device 40a. At the same time, using the surveying device 40a, angle measurements and/or distance measurements can also be carried out to the reflector fastened on the air vehicle 50 by means of the measuring beam 42a. Based on the measured directional angles and/or distances from surveying device 40a and the coordinates of the reference points determined by the surveying device 40b, the coordinates of the new point 2 and also the position and optionally the orientation of the surveying device 40a can be calculated via known geodetic methods (e.g., resection or arc resection). The mobile reference point provided by the air vehicle 50 can therefore be used as an activation point. Similarly to the above-mentioned embodiments, the air vehicle 50 can occupy suitable positions to overcome a visual obstruction caused by obstructions 80 and to provide a number of reference points.

The (absolute) coordinates of the mobile reference points and also, in further succession, of the new point 2 or of the surveying device 40a can, defined on a local coordinate system, relate to the setup point 4 and the alignment of the measuring device 40b. In addition, before the surveying procedure, the coordinates of the setup point 4 can be determined by further angle and/or distance measurements using the measuring device 40b and also the orientation thereof with respect to reference targets 6 known in a higher-order coordinate system. Methods known in surveying can also be used in this case.

The coordinates of the mobile reference points which are determined using the surveying device 40b can be transmitted via radio directly to the surveying device 40a. Alternatively or additionally thereto, for example, if a direct communication is not possible as a result of obstructions 80, the items of reference information can also first be transmitted from the surveying device 40b to the air vehicle 50 and then transmitted therefrom to the surveying device 40a. A communication or transmission of measured values can additionally be performed in the reverse direction originating from the surveying device 40a to the device 40b.

In addition, the air vehicle 50 can be equipped with a sensor unit 54, for example, consisting of a magnetometer, an inclination sensor, an acceleration sensor, and/or a yaw rate sensor, wherein the measurements of the sensor unit 54 can result in improved precision in the position determination of the mobile reference points or can be used for the determination of the alignments and movements of the air vehicle 50.

In addition, this sensor unit 54 can also be used for a determination of the position of the reference points or at least for the coarse determination thereof, in particular if the determination of the positions by the surveying device 40b fails. This case can occur, for example, if the automatic target tracking loses the connection to the target (reflector 57), for example. In this case, the coarse position, based on measurements of the sensor unit 54, can be transmitted to the surveying device 40a or the surveying device 40b via radio. Based on this information, the surveying device 40b can find the target again, the connection can be reestablished, and the automatic target tracking can be executed again.

Furthermore, after a first, coarse position determination of the new point 2 or of the position of the surveying device 40*a*, the coordinates thereof can be transmitted via radio to the air vehicle 50. Based on this information, a flight path for the air vehicle 50 can be automatically adapted, in order to provide an optimum geometry for the reference points for the position determination and therefore to achieve a higher precision. The information transmission from the surveying devices 40*a*, 40*b* to the air vehicle 50 can also be performed via a laser beam, in particular via the measuring beam 42*a*, 42*b*, which is used for the distance measurement. For this purpose, the air vehicle 50 can have a corresponding receiver apparatus.

Figure 7A:
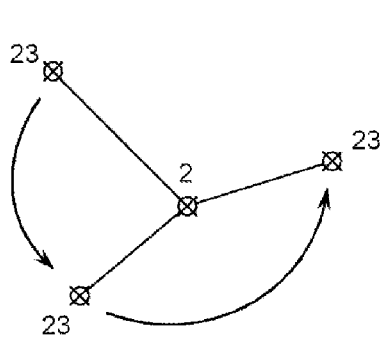
FIGS. 7a-b show suitable arrangements of reference points for determining a new point position.
Figure 7B:
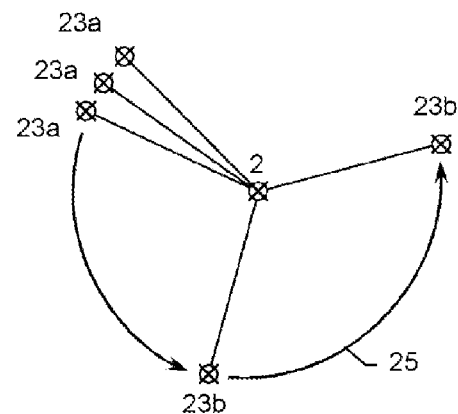

FIGS. 7*a* and 7*b* each show a geometric arrangement of reference points 23, 23*a*, 23*b* for the determination according to the invention of a position of a new point 2. In FIG. 7*a*, the reference points 23 are selected and arranged in such a manner that a determination of a new point position 2 can be performed uniquely and reliably, for example, by a resection or an arc resection, since a respective resection and an arc resection generate a substantially unique point of intersection, which is in particular subject to only a small uncertainty.

In contrast, FIG. 7*b* shows a selection of reference points 23*a*, 23*b* in such a manner that they result in an optimum geometric configuration for the determination of the new point 2 only after the points 23*b* have been added as additional reference points 23*b*. For this purpose, after a first coarse position determination of the new point 2 on the basis of the reference points 23*a*, the further reference points 23*b* for the air vehicle 50 can be calculated and approached, which results in an optimum geometric arrangement of the points 23*a*, 23*b* and therefore in a higher precision during the determination of the coordinates of the new point 2. In addition, the flight path 25 of the air vehicle 50 can be continuously adapted as a function of this precision to be optimized.

In addition, by way of a suitable selection of the reference points 23*a*, 23*b*, possible obstructions, which would interfere with, attenuate, or corrupt a transmission of measuring signals to the surveying device or away from the surveying device, can be avoided. This can be performed substantially automatically, in that the surveying device analyzes and evaluates the signal quality of the measurement signal upon the reception thereof. In the event of a poor signal, the air vehicle 50 can change its position in such a manner that the signal quality is increased. This information can be transmitted from the surveying instrument to the air vehicle, for example, via radio, wherein the air vehicle can be equipped with corresponding transmitter and receiver apparatuses. To avoid or bridge obstructions, items of information from a geo-information system may also be used, which can contain, for example, the positions and the dimensions of structures.

In the case of the selection of the reference points 23*a*, 23*b*, the ability to receive the GNSS signal can also be taken into consideration, which is used for the position determination of the air vehicle itself. In principle, this position can be determined with higher precision if the signal is received by as many GNSS satellites as possible. An optimization can therefore be performed in such a manner that the air vehicle searches for a measuring position which allows the reception of signals of as many GNSS satellites as possible, by avoiding signal shadows due to obstructions, for example, buildings. In addition, interfering effects, for example, multipath, can be taken into consideration in the selection of the reference points.

Figure 8:
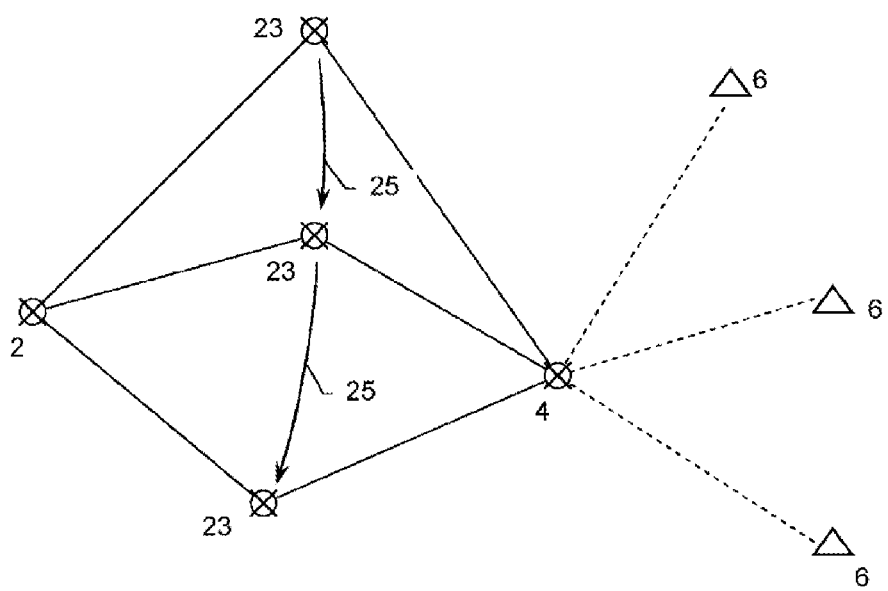
FIG. 8 shows a determination according to the invention of a new point position by way of mobile reference points.

FIG. 8 shows a sequence of a determination according to the invention of a new point position 2. This sequence can be carried out in particular using a surveying system 1 according to the invention according to the embodiment in FIG. 6. In a first step, an absolute setup position 4 of a surveying device 40*b* can be determined on the basis of points 6, the coordinates of which are known and which can be targeted by the surveying device 40*b*. Furthermore, proceeding from the setup position 4 of the surveying device 40*b*, a respective absolute reference point position 23 can be produced, wherein this position can be variable in a mobile manner by an air vehicle 50, by measuring of the reference point 23 by the surveying device 40*b*. In addition, the respective reference point 23 can be targeted by a further surveying device 40*a* at the new point 2 and an item of relative position information, for example, directional angle and/or distance, to the point 23 can be determined. A number of references can be generated by a movement of the air vehicle 50 or of the reference points 23 along a route 25, and a respective value pair having an absolute position specification of the reference point 23 and an item of relative reference information, for example, directional angle and/or distance, can be generated therefrom. The position of the new point 2 can then be concluded from at least three such value pairs by means of the known geodetic methods of arc resection or resection.

It is obvious that these illustrated figures only schematically represent possible exemplary embodiments. The various approaches can also be combined according to the invention with one another and with systems and methods for position determination or stationing of objects or for referencing of positions or coordinates of the prior art.

What is claimed is:

1. A geodetic surveying system comprising:
at least one reference component, each defining a reference point, wherein an absolute position of the reference point is known; and
at least one new point determination component, which derives a relative new point position, wherein:
a mutual relative reference information between the reference component and the new point determination component is derivable for the purpose of referencing with respect to the reference point position;
the surveying system has an automotive, unmanned, controllable air vehicle;
the air vehicle carries the reference component, by which the at least one reference point is provided as a mobile reference point; and
the air vehicle is implemented in such a manner that the reference component is freely displaceable spatially and is positionable substantially fixed in position by the air vehicle relative to the new point determination component.

2. The geodetic surveying system as claimed in claim 1, wherein
the surveying system has a reference point determination component for the determination of the absolute reference point position in an absolute coordinate system, so that a line of sight between the reference component and respectively the new point determination component and the reference point determination component can be indirectly generated by a specific positioning of the reference component, and a referencing of the new point position in the absolute coordinate system can be carried out, and/or a number of reference points can be generated by the spatial displacement of the air vehicle, and the air vehicle is displaceable and positionable in an altitude range of 1 m to 1000 m, and/or the surveying system has an analysis unit for
  detecting and assigning;
    the absolute reference point position, which is determined and provided by the reference point determination component, of the reference point; and
    the relative reference information between the reference component and the new point determination component including measured angles and/or a distance to the respective reference point, wherein the relative reference information can be determined and provided by the new point determination component as a function of the reference point position and a position of the new point determination component; and
  generating a pairing from the assignment of the absolute reference point position and the relative reference information.

3. The surveying system as claimed in claim 2, wherein the air vehicle is displaceable and positionable in an altitude range of 2 m to 50 m.

4. The surveying system as claimed in claim 2, wherein:
the reference component has a reflector; and
the reference point determination component has a geodetic surveying device including a total station or a theodolite, having at least:
  a first targeting apparatus including a telescopic sight, wherein the first targeting apparatus is pivotable by a motor to change an alignment thereof with respect to a first base of the surveying device and includes:
    a first emission unit which defines a first optical target axis; and
    a first beam source for the emission of a first optical measuring beam for the distance measurement in parallel coaxially to the first optical target axis;
    first angle measuring functionality for high precision acquisition of the alignment of the first target axis; and
    first analysis means for data storage and control of the alignment of the first targeting apparatus, and wherein:
  the first measuring beam can be continuously aligned on the reflector so that the absolute reference point position of the reference point can be determined and provided in a geodetically precise manner; and/or
  the reference point determination component has at least one transmitter unit for emitting positioning signals; and
  the reference component is implemented in such a manner that the positioning signals are receivable by means of a GNSS antenna, and the reference point position can be determined from the positioning signals, wherein:
    the transmitter unit is implemented as a GNSS transmitter including a GNSS satellite, GPS, GLONASS, or Galileo satellite, and the positioning signals are embodied by GNSS signals;
    the reference point determination component has a GNSS reference station for emitting GNSS correction signals; and the reference component is implemented in such a manner that the GNSS correction signals are receivable and the reference point position can be determined from the received GNSS signals and the GNSS correction signals.

5. The surveying system as claimed in claim 2, wherein:
the surveying system has a control unit, wherein the control unit is configured in such a manner that a spatial geometric arrangement of the reference points is automatically definable and the geometric arrangement of the reference points is definable as a function of an optimization to generate the pairing; and/or
the control unit is configured in such a manner that the air vehicle is positionable as a function of the reference point position, which can be continuously and automatically determined by means of the reference point determination component and/or as a function of the geometric arrangement of the reference points; and/or
the control unit is configured in such a manner that a flight path is definable and the air vehicle is movable along the flight path where the flight path is definable as a function of the spatial geometric arrangement of the reference points.

6. The surveying system as claimed in claim 1, wherein:
the air vehicle has a sensor unit for determining an alignment of the air vehicle including an inclination sensor, a magnetometer, an acceleration sensor, a yaw rate sensor, and/or a velocity sensor; and/or
the surveying system has a remote control unit, wherein the remote control unit is implemented in such a manner that a control of the air vehicle and/or a generation of the pairing can be carried out, wherein a communication between the remote control unit and/or the reference point determination component and/or the new point determination component and/or the reference component can be carried out via wire, or by means of radio, infrared, or laser signals; and/or
the reference component is implemented in such a manner that the reference point position and/or the relative reference information can be provided indirectly by the reference component, wherein the reference component has a transmitter for emitting and/or a receiver unit for receiving the reference point position and/or the relative reference information, wherein the reference point position and/or the relative reference information are transmittable via wire, or by means of radio, infrared, or laser signals, wherein positioning signals can be modulated onto the reference point position.

7. The surveying system as claimed in claim 1, wherein the reference component has the reflector and the new point determination component includes:
a second targeting apparatus, wherein the second targeting apparatus is pivotable by a motor to change an alignment thereof with respect to a second base of the new point determination component and includes:
  a second emission unit which defines a second optical target axis;
  a second beam source for the emission of a second optical measuring beam for distance measurement coaxially to the second optical target axis;
  second angle measuring functionality for high-precision acquisition of the alignment of the second target axis; and
  second analysis means for data storage and control of the alignment of the second targeting apparatus, and wherein:

the second measuring beam can be continuously aligned on the reflector so that the relative reference information for the position referencing of the new point determination component can be determined and provided as a function of the reference point position, so that the pairing and/or the new point position and/or a position of a measurable target point can be determined in the absolute coordinate system; or the reference component has a pseudo-satellite module for emitting the positioning signals and the positioning signals represent the absolute reference point position, and the new point determination component has a pseudo-satellite receiver, wherein the pseudo-satellite receiver is implemented in such a manner that the positioning signals emitted by the pseudo-satellite module are receivable and the relative reference information can be determined and provided, so that the new point position can be determined in the absolute coordinate system.

8. A geodetic referencing method using:

at least one reference component, each defining a reference point, wherein an absolute position of the reference point is known; and at least one new point determination component, which derives a relative new point position, wherein the method comprise the steps:

for the purpose of referencing with respect to the reference point position, deriving a mutual relative reference information between the at least one reference component and at least one new point determination component;

providing the at least one reference point as a mobile reference point by the reference component;

carrying the reference component by an automotive, unmanned, controllable air vehicle; and implementing the air vehicle in such a manner that the reference component is freely displaced spatially and substantially fixed in position, by the air vehicle relative to the new point determination component.

9. The geodetic referencing method as claimed in claim 8, wherein:

the absolute reference point position is determined in an absolute coordinate system using a reference point determination component, and/or by a specific positioning of the reference component, a line of sight is indirectly generated between the reference component and respectively the new point determination component and the reference point determination component and a referencing of the new point position in the absolute coordinate system is carried out, and/or the mobile reference point is spatially displaced by the air vehicle, so that a number of reference points is generated, and the air vehicle is displaced and positioned in an altitude range of 1 m to 1000 m; and/or an acquisition and assignment:

of the absolute reference point position of the reference point, which is determined and provided by the reference point determination component, and the relative reference information of measured angles and/or a distance to the respective reference point, wherein the relative reference information is determined and provided by the new point determination component as a function of the reference point position and a position of the new point determination component; and a generation of a pairing from the assignment of the absolute reference point position and the relative reference information is performed.

10. The geodetic referencing method as claimed in claim 9, wherein the mobile reference point is spatially displaced by the air vehicle, so that a number of reference points is generated, and the air vehicle is displaced and positioned in an altitude range of 2 m to 50 m.

11. The geodetic referencing method as claimed in claim 10, wherein, in the scope of the method, positioning signals provided by the reference point determination component are received by the reference component including GNSS signals provided by GNSS satellites and the GNSS signals are represented by GPS, GLONASS, or Galileo signals, and the reference point position is determined and provided from the received positioning signals, and/or the determination and provision of the reference point position is performed by means of a first measuring beam, which is reflected on the reference component and is emitted by the reference point determination component; and/or a determination of an alignment of the air vehicle in the pitch, roll, and yaw directions is performed, wherein the determination of the alignment is performed by means of an internal sensor unit assigned to the air vehicle by means of inclination sensor, magnetometer, acceleration sensor, yaw rate sensor, and/or velocity sensor.

12. The geodetic referencing method as claimed in claim 10, wherein:

in the scope of the method, the positioning signals and the pseudo-satellite signals representing the reference point position, are emitted by the reference component and the positioning signals are received by new point determination component and the relative reference information is determined as a function of the reference point position, so that the new point position is determined in the absolute coordinate system; or the determination of the relative reference information is performed by means of a second measuring beam, which is emitted by the new point determination component and is reflected on the reference component, so that the pairing and/or the new point position are determined in the absolute coordinate system a position of a measured target point.

13. The geodetic referencing method as claimed in claim 9, wherein:

a spatial geometric arrangement of the reference points is defined automatically and the geometric arrangement of the reference points is optimized as a function of the generation of the pairing; and/or the air vehicle is positioned as a function of the reference point position, which can be continuously automatically determined, and/or as a function of the geometric arrangement of the reference points; and/or a flight path is defined and the air vehicle is moved along the flight path where the flight path is defined as a function of the spatial geometric arrangement of the reference points.

14. An automotive, unmanned, controllable air vehicle for a surveying system as claimed in claim 1, wherein the air vehicle is freely displaceable spatially and positionable substantially fixed in position, relative to the new point determination component, wherein the air vehicle carries a reference component for providing a mobile reference point.

15. The air vehicle as claimed in claim 14 for a surveying system, wherein:
- control data for controlling the air vehicle are receivable and/or
- the control data for controlling the air vehicle are derivable by a processing unit from receivable items of reference information to determine an absolute reference point position and an air vehicle alignment can be determined by a sensor unit assigned to the air vehicle, and the absolute reference point position and the relative reference information can be linked by the processing unit, so that a pairing can be generated, and/or
- the air vehicle is implemented in such a manner that:
  - the mobile reference point is spatially displaceable, and positionable substantially fixed in position, by the air vehicle, so that a number of reference points and pairings can be generated; and
  - the air vehicle is displaceable and positionable in an altitude range of 1 m to 1000 m; and/or
  - the reference component has a pseudo-satellite module for emitting positioning signals for determining the relative reference information for determining a new point position in an absolute coordinate system; and/or
  - the reference component has a reflector for determining the relative reference information by targeting the reflector using a laser beam, so that the pairings and/or the new point position can be determined in the absolute coordinate system for a position of a measurable target point.

16. The air vehicle as claimed in claim 15 for a surveying system, the air vehicle is displaceable and positionable in an altitude range of 2 m to 50 m.

17. A use of an unmanned, controllable, automotive air vehicle for carrying a reference component for a surveying system as claimed in claim 1.

18. A computer program product, which is stored on a non-transitory tangible machine-readable carrier having program code for carrying out the method as claimed in claim 8.

* * * * *